US012437630B1

(12) United States Patent
Bogema

(10) Patent No.: US 12,437,630 B1
(45) Date of Patent: Oct. 7, 2025

(54) GROUND VIBRATION PERSONAL SECURITY SYSTEM

(71) Applicant: Kimberley Lynn Bogema, Scarborough (CA)

(72) Inventor: Kimberley Lynn Bogema, Scarborough (CA)

(73) Assignee: Kimberley Lynn Bogema, Ontario, CA (US)

( * ) Notice: Subject to any disclaimer, the term of this patent is extended or adjusted under 35 U.S.C. 154(b) by 0 days.

(21) Appl. No.: 19/186,702

(22) Filed: Apr. 23, 2025

Related U.S. Application Data

(60) Provisional application No. 63/656,307, filed on Jun. 5, 2024.

(51) Int. Cl.
*G08B 25/01* (2006.01)
*G08B 21/04* (2006.01)
*G08B 21/22* (2006.01)
*G08B 25/10* (2006.01)

(52) U.S. Cl.
CPC ....... *G08B 25/016* (2013.01); *G08B 21/0423* (2013.01); *G08B 21/043* (2013.01); *G08B 21/0446* (2013.01); *G08B 21/0492* (2013.01); *G08B 21/22* (2013.01); *G08B 25/10* (2013.01)

(58) Field of Classification Search
CPC ......................... G08B 25/016; G08B 21/0423; G08B 21/043; G08B 21/0492; G08B 21/22; G08B 25/10
See application file for complete search history.

(56) References Cited

U.S. PATENT DOCUMENTS

| | | | | |
|---|---|---|---|---|
| 4,223,304 | A | 9/1980 | Barowitz et al. | |
| 6,650,239 | B1 | 11/2003 | Hron | |
| 7,616,115 | B2 | 11/2009 | Horak et al. | |
| 8,331,195 | B1 | 12/2012 | Schumer et al. | |
| 8,615,476 | B2 | 12/2013 | Berger et al. | |
| 9,743,013 | B1 * | 8/2017 | Merrill | G08B 13/19641 |
| 10,534,819 | B2 * | 1/2020 | Ricci | A61B 5/7405 |
| 11,250,691 | B2 * | 2/2022 | Levy | H04N 7/181 |
| 2014/0203932 | A1 | 7/2014 | Turner et al. | |

(Continued)

FOREIGN PATENT DOCUMENTS

RU 203955 U1 4/2021

*Primary Examiner* — John A Tweel, Jr.
(74) *Attorney, Agent, or Firm* — Argus Intellectual Enterprise, LLC; Jordan Sworen; Daniel Enea

(57) ABSTRACT

A ground vibration personal security system is provided. The system includes a user control panel which may be controlled via onboard controls or remotely via a smartphone or similar device. The user control panel may also be embodied in software on the smartphone itself. The user control panel includes alert lights, alarm speakers, display panels, long-lasting rechargeable batteries, and vibration sensors. The vibration sensors are configured to detect and distinguish between approaching animal and human footsteps. The system can be customized to account for different weights and types of approaching potential threats. When a threat is detected, the system is configured to emit audible alarms, flash alert lights, and transmit an alert signal to emergency authorities. The timing and function of the alarms and alert signal transmission can also be customized by the user. The system provides enhanced safety and peace of mind for individuals who are tent camping.

18 Claims, 3 Drawing Sheets

(56) References Cited

U.S. PATENT DOCUMENTS

| | | | | |
|---|---|---|---|---|
| 2018/0252828 | A1 | 9/2018 | Turnbull et al. | |
| 2020/0160678 | A1 | 5/2020 | Levy | |
| 2021/0325564 | A1 * | 10/2021 | Tinker | G01V 1/18 |
| 2022/0101709 | A1 | 3/2022 | Song et al. | |

* cited by examiner

GROUND VIBRATION PERSONAL SECURITY SYSTEM

CROSS REFERENCE TO RELATED APPLICATION

This application claims the benefit of U.S. Provisional Application No. 63/656,307 filed on Jun. 5, 2024; the above identified patent application is herein incorporated by reference in its entirety.

BACKGROUND OF THE INVENTION

The present invention relates to personal security systems for use while camping. More specifically, the present invention relates to a ground vibration-based security system that detects and distinguishes between approaching animals and humans, alerts the individual in the tent of their presence, and, if necessary, transmits an alert signal to an emergency authority or other monitoring station.

Tent camping is a widely enjoyed outdoor activity, offering an opportunity to connect with nature, disconnect from the demands of modern life, and experience the wilderness. However, despite its many benefits, tent camping presents inherent security risks, particularly for individuals camping alone or in remote locations. Tents, unlike permanent shelters, provide minimal physical protection, relying primarily on thin fabric walls that offer little resistance against potential intruders—whether they are wildlife or unauthorized persons. Many campers rely on traditional security measures such as keeping flashlights and weapons nearby, setting up makeshift perimeter alarms, or bringing dogs for added security. However, these methods do not always provide reliable early warning systems, leaving campers vulnerable to unexpected threats.

Existing security devices designed for campers include motion detectors, tripwire alarms, and pressure-sensitive mats that activate an alarm when triggered. However, many of these devices suffer from significant limitations. Motion detectors, for example, often rely on infrared technology, which can be easily triggered by swaying tree branches, wind-blown debris, or even changes in temperature, leading to frequent false alarms. Additionally, they often struggle to distinguish between animals and humans, making them impractical for campers accompanied by pets. Tripwire alarms provide another alternative, using a physical wire that, when disturbed, triggers an audible alert. While effective in some cases, these systems require careful setup, can be accidentally triggered by the camper or harmless wildlife, and do not provide any remote alert functionality. Pressure-sensitive mats, another available option, only detect intrusions in a limited area, making them unsuitable for monitoring a broader perimeter around a campsite. Furthermore, these devices generally do not offer remote connectivity to notify emergency services in the event of a security breach, leaving campers without recourse if they are incapacitated or unable to respond to an intrusion.

In addition to the limitations of conventional security systems, many campers require a solution that is lightweight, portable, and capable of operating without a fixed power source. Many commercially available security systems rely on hardwired connections or large batteries, making them impractical for campers who need to travel light. Additionally, existing security solutions often do not provide silent alarm options, which could be critical in situations where a user wishes to summon help discreetly without alerting a potential intruder to their distress. Similarly, a system that can detect an individual's movements, including falls, and automatically send an alert could enhance safety for solo campers or individuals in distress.

Recognizing the need for a more effective, portable, and customizable security solution for campers, the present invention provides a ground vibration-based personal security system that overcomes the deficiencies of existing methods. By using vibration sensors to detect and differentiate between human and animal footsteps, the system reduces false alarms and provides a more reliable early warning mechanism. Unlike conventional motion detectors or pressure-sensitive mats, the system does not require line-of-sight positioning and can monitor a wider perimeter around a tent. It also comprises customizable alert thresholds, allowing campers to adjust sensitivity based on their specific needs, such as ignoring movement from a pet while still detecting potential intruders. Additionally, the system includes remote connectivity, enabling users to receive alerts on their smartphone and transmit distress signals to emergency authorities when necessary. By integrating advanced security features into a compact, lightweight, and durable design, the present invention significantly improves personal safety for tent campers.

In light of the systems and methods disclosed in the known art, it is submitted that the present invention substantially diverges in design elements and methods from the known art and consequently it is clear that there is a need in the art for an improvement in personal security systems designed for use while camping. In this regard the instant invention substantially fulfills these needs.

SUMMARY OF THE INVENTION

In view of the foregoing disadvantages inherent in the known systems and methods for providing camping security now present in the known art, the present invention provides a personal security system for tent campers that detects and distinguishes between approaching animals and humans, alerts the individual in the tent of their presence, and potentially transmits an alert signal to an emergency authority or other monitoring station.

It is an objective of the present invention to provide a ground vibration personal security system that utilizes vibration sensors to detect and distinguish between approaching human and animal footsteps. The system analyzes vibration patterns to differentiate between these movement types, thereby reducing false alarms and ensuring a more accurate security response. This functionality enhances user safety by providing an early warning system that can detect potential threats before they reach the tent.

It is an objective of the present invention to provide a ground vibration personal security system comprising a user control panel with onboard controls and remote operability via a smartphone or similar computing device. The control panel includes input mechanisms, a display screen, and a microcontroller configured to process sensor data and issue alerts based on user-defined parameters. Wireless connectivity allows for remote monitoring, enabling users to receive real-time alerts on their smartphone even when they are not inside the tent.

It is an objective of the present invention to provide a ground vibration personal security system comprising customizable alert settings, allowing users to adjust sensitivity levels, alarm types, and emergency signal transmission preferences. The system enables users to configure detection thresholds to accommodate factors such as the presence of pets, nearby campers, or environmental conditions that may affect vibration readings. Users can select between different alarm modes, including audible alarms, flashing visual indicators, or silent alert transmissions to emergency authorities.

It is an objective of the present invention to provide a ground vibration personal security system that is compact, lightweight, and designed for easy transport and setup in outdoor environments. The system is constructed from durable, weather-resistant materials to withstand exposure to various environmental conditions, including extreme temperatures, moisture, and rough terrain. The housing of the control panel is designed to be impact-resistant to protect internal components from accidental damage during transportation or use. The lightweight design ensures that backpackers and remote campers can carry the system without adding significant weight to their gear.

It is an objective of the present invention to provide a ground vibration personal security system that includes a rechargeable battery with extended operational life, supplemented by a solar panel for continuous power generation. The integrated solar panel enables passive charging during daylight hours, reducing reliance on external power sources and enhancing system longevity in off-grid settings.

It is an objective of the present invention to provide a ground vibration personal security system that includes a silent alarm mode to allow users to discreetly transmit an alert signal to emergency authorities without triggering an audible alarm. The system allows the user to input a silent distress code, which disables the audible alarm while activating the emergency signal transmission.

It is an objective of the present invention to provide a ground vibration personal security system that includes fall detection functionality to enhance safety for solo campers or individuals in distress. The system utilizes vibration sensors and other motion-detecting components to identify abrupt movements or impacts indicative of a fall. If the system detects a fall and no user response is received within a predetermined timeframe, an automatic emergency signal is transmitted to alert designated contacts or emergency services.

It is an objective of the present invention to provide a ground vibration personal security system that includes user gait recognition capabilities to monitor movement patterns and distinguish between the user and unknown individuals approaching the tent. The system is configured to store and recognize the unique gait pattern of an authorized user, allowing it to differentiate between the user's movements and those of an approaching intruder.

It is an objective of the present invention to provide a ground vibration personal security system that automatically alerts emergency authorities if the system detects that the user has left the tent and has not returned within a predetermined timeframe. The system allows users to define an expected return window, after which an alert signal is transmitted if the user remains absent beyond the set threshold.

It is an objective of the present invention to provide a ground vibration personal security system that integrates additional sensing technologies, including image sensors, infrared sensors, and temperature sensors, to enhance detection accuracy. These supplementary sensors work in conjunction with vibration sensors to verify the presence of an approaching human or animal, further reducing false alarms and improving response precision. The multi-sensor approach enables the system to adapt to different environmental conditions and user preferences for security monitoring.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings.

DETAILED DESCRIPTION OF THE INVENTION

Reference is made herein to the attached drawings. For the purpose of presenting a brief and clear description of the present invention, the preferred embodiment will be discussed as used for detecting approaching animals or humans and alerting the user of their presence for enhanced security while tent camping. The figures are intended for representative purposes only and should not be considered to be limiting in any respect.

Reference will now be made in detail to the exemplary embodiment(s) of the invention. References to "one embodiment," "at least one embodiment," "an embodiment," "one example," "an example," "for example," and so on indicate that the embodiment(s) or example(s) may include a feature, structure, characteristic, property, element, or limitation but that not every embodiment or example necessarily includes that feature, structure, characteristic, property, element, or limitation. Further, repeated use of the phrase "in an embodiment" does not necessarily refer to the same embodiment.

Figure 1:
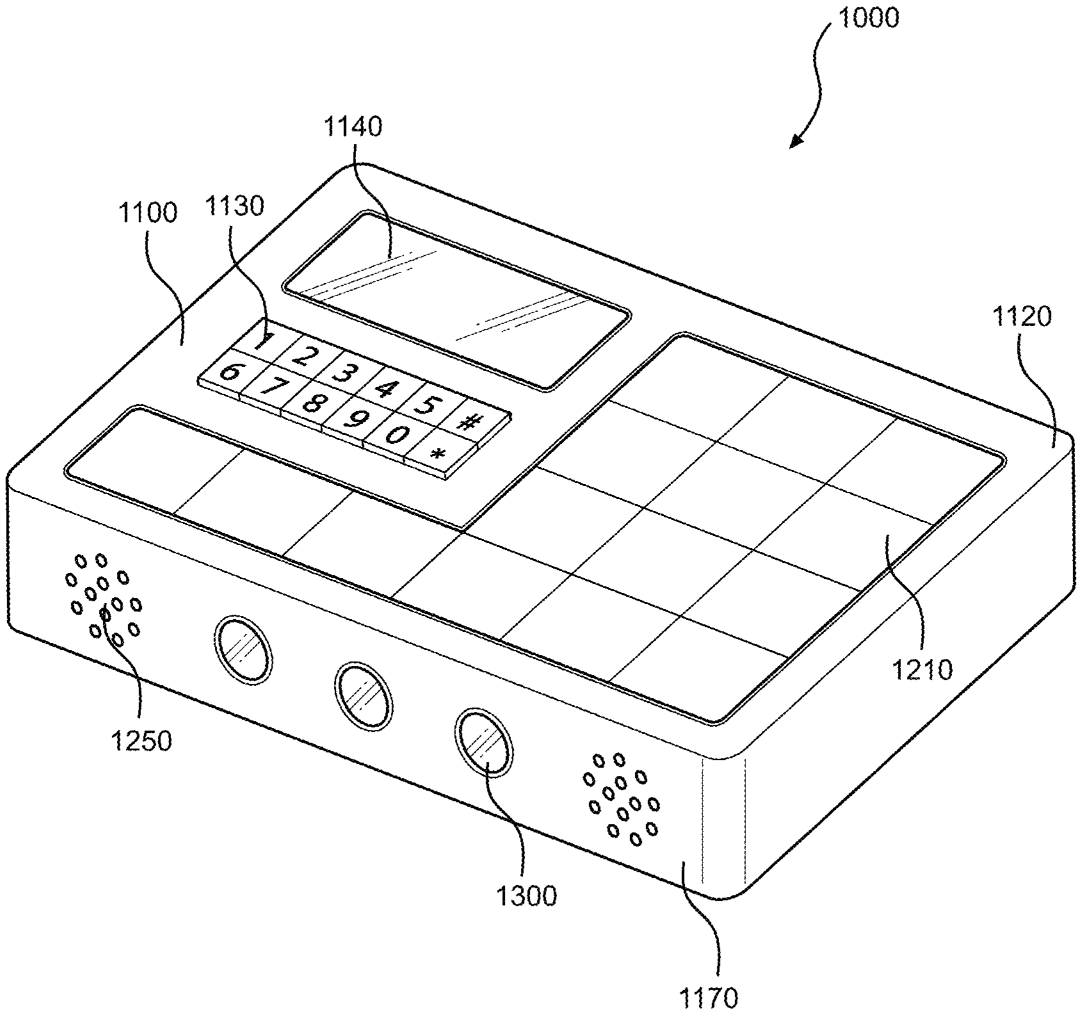
FIG. 1 shows a perspective view of a user control panel from an embodiment of the ground vibration personal security system.
Figure 2:
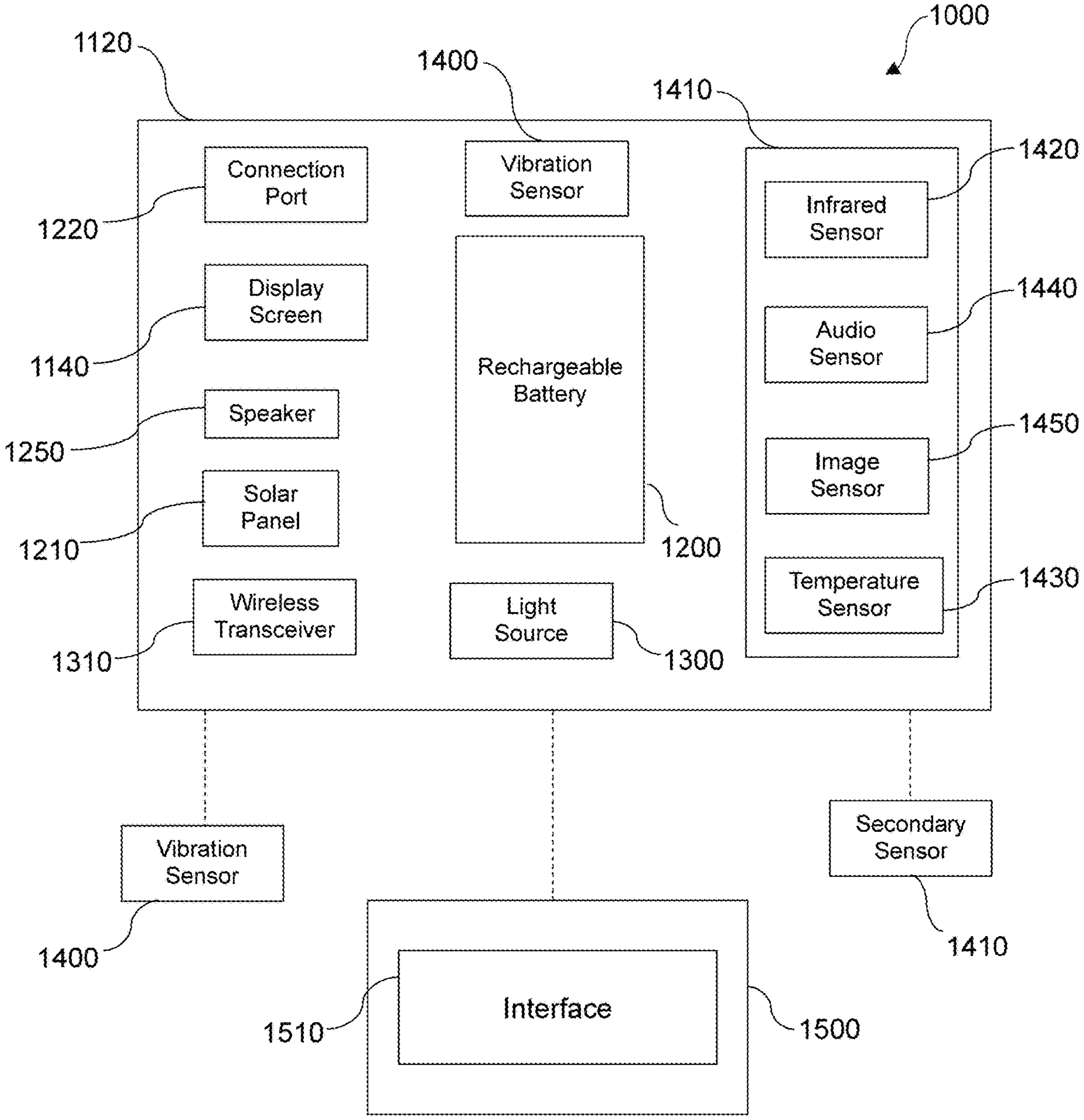
FIG. 2 shows a block diagram of an embodiment of the ground vibration personal security system.

Referring now to FIGS. 1 and 2, there is shown a perspective view of a user control panel from an embodiment of the ground vibration personal security system and a block diagram of an embodiment of the ground vibration personal security system, respectively. In the shown embodiment, the system 1000 includes at least one user control panel 1100, which comprises a housing 1120 enclosing electronic components and a display screen 1140. The housing 1120 is constructed from any suitable material, such as high-impact thermoplastic, including polycarbonate or acrylonitrile butadiene styrene (ABS), selected for its shock resistance, weather resistance, and lightweight properties. In some embodiments, the outer shell of the housing is further treated with a UV-resistant and corrosion-resistant coating to enhance durability in prolonged outdoor exposure. The housing 1120 comprises sealed gaskets and reinforced seams to provide ingress protection against water, dust, and debris, ensuring operational reliability in extreme temperatures, humidity, and rugged terrain.

The user control panel 1100 further includes one or more input mechanisms 1130, which may include physical push buttons, capacitive touch-sensitive controls, or a resistive touchscreen interface. In some embodiments, the input mechanism 1130 is configured with tactile feedback or haptic response to allow for operation in low-visibility conditions or while wearing gloves. In the illustrated embodiment, the display screen 1140 is a high-contrast LED or OLED panel designed to provide clear visibility in both direct sunlight and low-light environments. The display 1140 is housed beneath a shatter-resistant tempered glass or polycarbonate cover, ensuring impact resistance and preventing damage from accidental drops or environmental debris. In one embodiment, the display screen 1140 includes an anti-glare coating and a backlight adjustment system, allowing users to optimize visibility based on ambient lighting conditions. In some embodiments, the user control panel 1100 includes a secondary monochrome e-paper display to provide low-power status updates and extended battery operation when the primary display is inactive.

In the illustrated embodiment, the electronic components of the user control panel 1100 are powered via an onboard rechargeable battery 1200, which serves as the primary power source for system operation. In some embodiments, the battery 1200 is a high-capacity lithium-ion (Li-ion) or lithium-polymer (LiPo) cell with an energy density optimized for extended operation in remote environments. The battery is configured to support multi-day or multi-week functionality under standard usage conditions, incorporating intelligent power management circuitry to regulate energy consumption based on system activity. Additionally, the battery 1200 is equipped with overcharge protection, temperature monitoring sensors, and a deep-discharge prevention mechanism to enhance safety and longevity.

The housing 1120 integrates an exterior solar panel 1210, which is composed of monocrystalline or polycrystalline photovoltaic (PV) cells for high-efficiency solar energy conversion. In some embodiments, the solar panel 1210 is electrically connected to a charge controller circuit, which optimizes power transfer to the battery 1200, preventing overvoltage and maximizing recharging efficiency under varying sunlight conditions. The solar panel 1210 is surface-treated with an anti-reflective coating to improve energy absorption and protected by a scratch-resistant, weatherproof encapsulation layer to ensure durability in outdoor environments. In the illustrated embodiment, the solar panel 1210 is disposed on the upper surface of the housing 1120. However, in alternate embodiments, the solar panel is disposed on any suitable exterior location of the housing.

For auxiliary power options, the housing 1120 includes connection ports 1220, which may support USB Type-C, DC barrel jack, or proprietary power connectors to enable wired charging from an external battery pack, portable generator, or wall adapter. The charging system incorporates dynamic power management circuitry, which prioritizes wired charging when available and seamlessly switches to solar power when disconnected from an external source.

The housing 1120 further incorporates at least one speaker 1250 and at least one alert light 1300, which serve as primary user notification mechanisms. The speaker 1250 is a water-resistant, high-decibel transducer capable of producing audible alerts with adjustable volume levels, ensuring effective notification in high-noise outdoor environments. In the illustrated embodiment, the alert light 1300 uses high-intensity LED modules that emit flashing or continuous illumination patterns, customizable based on user preferences and environmental conditions. The LEDs are designed for low power consumption while maintaining maximum visibility in fog, darkness, or adverse weather conditions. In the shown embodiment, both the light sources 1300 and speakers 1250 are disposed on a front side 1170 of the housing 1120. However, in alternate embodiments, the light source and speaker are disposed on any suitable location of the housing. The alerting lights 1300 of the user control panel 1100 are shown centered on the housing, making them easy to see regardless of the position of the housing.

In some embodiments, the user control panel 1100 incorporates a wireless transceiver 1310 configured to establish bidirectional communication between the control panel 1100 and a user's smartphone or similar computing device. The wireless transceiver 1310 supports multiple communication protocols, including Wi-Fi (IEEE 802.11), Bluetooth Low Energy (BLE), Long Range (LoRa), and cellular networks (4G LTE/5G), ensuring robust connectivity across various environments. The wireless module is designed with low-power operation modes to minimize energy consumption while maintaining real-time synchronization with the connected device.

In some embodiments, the smartphone or computing device 1500 is equipped with a dedicated software application having an interface 1510 that enables users to configure security settings, monitor real-time alerts, adjust sensor thresholds, and control alarm functions remotely. The application interface allows for manual activation/deactivation of alarms, customization of detection sensitivity, and management of emergency contact settings. In addition, the software can provide push notifications, SMS alerts, or automated voice call notifications when an alarm condition is triggered.

In some embodiments, a smartphone or similar handheld computing device serves as the primary user control panel, replacing the standalone control panel. The smartphone's capacitive touchscreen or alternative input mechanism provides an intuitive user interface for displaying system status, adjusting alert preferences, and managing event logs. The smartphone's high-resolution display is optimized for daylight readability, ensuring visibility in bright outdoor conditions.

To enhance alert mechanisms, the smartphone's built-in speakers can emit high-decibel audible alerts, and the device's LED flash or screen illumination can function as a visual indicator for security events. In some embodiments, the system is further integrated with a vibration-based notification system, allowing users to receive silent alerts via haptic feedback.

Additionally, in some embodiments, the user control panel 1100 incorporates a microphone array with noise-canceling technology, enabling voice command functionality for hands-free operation. In embodiments where a smartphone serves as the control panel, the system may leverage the smartphone's built-in microphone for voice recognition, allowing users to issue commands such as arming/disarming the system, adjusting sensitivity settings, or requesting emergency assistance.

The system incorporates at least one vibration sensor 1400, configured to detect ground vibrations generated by footsteps of an approaching human or animal. In the illustrated embodiment, the vibration sensor 1400 is a high-sensitivity geophone, piezoelectric accelerometer, or micro-electromechanical system (MEMS) sensor, capable of capturing low-frequency seismic waves and microtremors indicative of movement patterns. The vibration sensor 1400 is embedded within a shock-isolated housing to minimize interference from ambient vibrations, such as wind, rain, or minor environmental disturbances. The vibration data is processed by the microcontroller 1500, which applies digital signal processing (DSP) algorithms and machine learning-based pattern recognition to differentiate between human gait signatures and animal movement patterns. In some embodiments, the vibration sensor is incorporated within the housing 1120. In alternate embodiments, the system 1000 comprises both a vibration sensor disposed within the user control unit and external thereto for placement around surrounding areas.

The system 1000 includes software-based classification algorithms that analyze distinct vibration frequency, amplitude, and stride periodicity associated with different types of footsteps. By filtering out background noise and non-threat vibrations, the system significantly reduces false alarms, allowing a high degree of accuracy in intrusion detection. Additionally, the system 1000 can be trained to recognize individual user gait patterns, allowing it to detect when an authorized user leaves or returns to the tent. In this way, the system 1000 prevents unnecessary alerts when the user moves within the monitored area while maintaining security against unknown entities.

To enhance user awareness, the system 1000 is configured to issue distinct alert responses based on the classification of the detected entity. For example, if a human intruder is detected, the system 1000 is configured to trigger a high-decibel audible alarm, activate flashing warning lights, and transmit an emergency alert signal. Conversely, if an animal is detected, the system can issue a lower-intensity warning sound or visual alert, preventing unnecessary alarm escalation. The system further allows users to customize these response settings via the user control panel 1100 or smartphone application, tailoring security responses based on individual preferences.

In some embodiments, the system 1000 includes test and practice programming modes, which allows a user to manually calibrate sensitivity thresholds, store personal gait profiles, and refine detection accuracy. These modes facilitate adaptive learning, allowing the system to optimize its recognition capabilities over time. Additionally, the system may store historical movement data, enabling trend analysis and long-term behavioral monitoring for enhanced situational awareness in outdoor environments.

In the illustrated embodiment, the threshold sensitivity levels of the ground vibration personal security system 1000 can be adjusted through the user control panel 1100 or a remotely connected smartphone application, allowing for customization of detection parameters based on specific environmental conditions and user preferences. The sensitivity adjustment algorithm enables dynamic filtering of detected vibrations, reducing the likelihood of false alarms caused by non-threatening movements such as small animals, wind-induced ground disturbances, or background environmental noise. The system allows for real-time threshold calibration, enabling users to define minimum amplitude, frequency, and periodicity values that must be met for an alert to be triggered.

For example, an individual camping with a dog or other domesticated pet may configure the system 1000 to ignore vibrations generated by animals below a specified weight threshold or with a recognized gait pattern. This is accomplished through motion signature analysis, wherein the microcontroller 1500 applies pattern recognition algorithms to differentiate between the movement profiles of known pets and unidentified entities. The user may also define custom exclusion zones within the detection perimeter, ensuring that the system only monitors movement in critical areas while ignoring designated safe zones.

In addition to vibration sensors 1400, the system can integrate auxiliary sensing technologies or secondary sensors 1410 to enhance detection accuracy and provide multi-modal threat assessment. These additional sensors may include: Infrared sensors (IR) 1420, which detect thermal signatures to differentiate between warm-blooded creatures and inanimate objects. Temperature sensors 1430, which monitor environmental fluctuations and help verify the presence of biological movement based on heat dispersion patterns. Audio sensors 1440, which capture and analyze acoustic signatures, enabling detection of footsteps, breathing, rustling, or vocalizations that may indicate the presence of a human or animal intruder. Image sensors 1450 or computer vision modules, which provide visual confirmation of detected movement, enhancing threat classification and reducing false alarms caused by non-intrusive ground vibrations. By providing both the vibration sensor 1400 and one or more secondary sensors 1410, the system 1000 correlates data from multiple sensing modalities to refine intruder detection accuracy while allowing for customized user-defined sensitivity levels.

Figure 3:
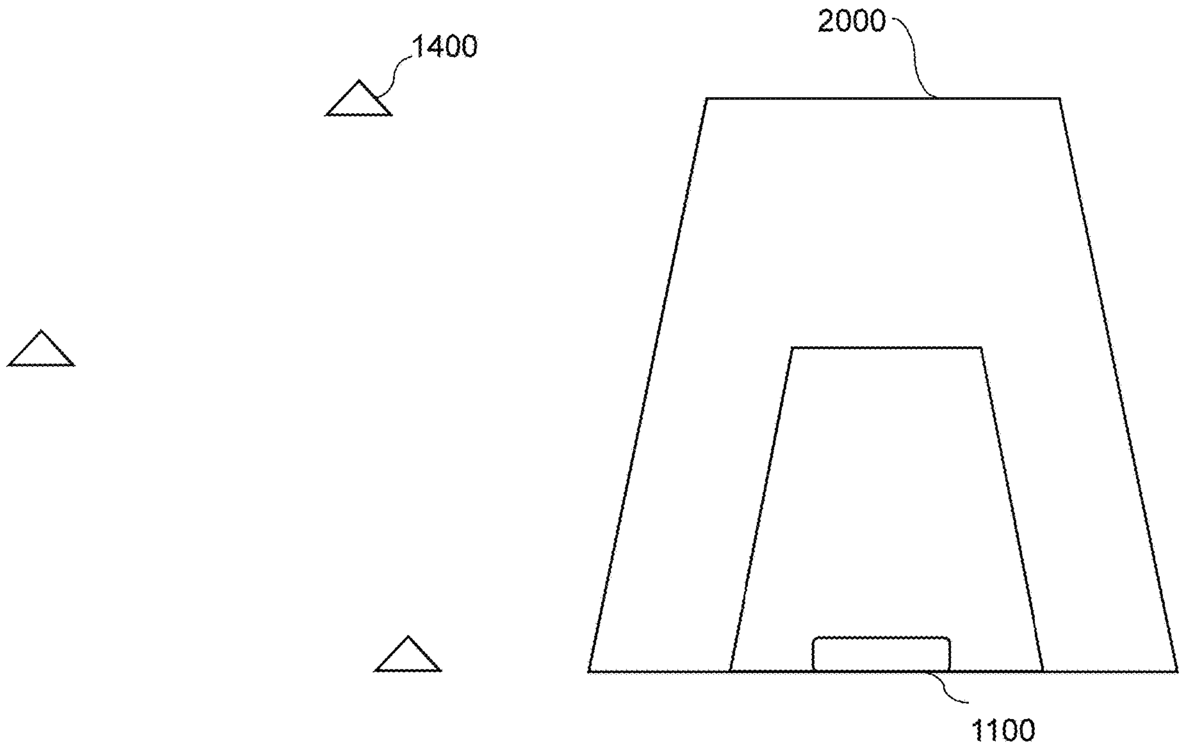
FIG. 3 shows an illustration of an embodiment of the ground vibration personal security system in use in a tent.

Referring now to FIG. 3, there is shown a perspective view of an embodiment of the ground vibration personal security system in use in a tent. In this embodiment, the user control panel 1100 is placed inside the tent and serves as the primary interface for security monitoring and alert management. One or more vibration sensors 1400 are positioned on the ground surrounding the tent 2000, configured to detect and analyze subsurface vibrations generated by approaching footsteps. The system continuously monitors a defined detection perimeter, which can be adjusted by the user to specify the desired monitoring radius based on environmental conditions and security needs. The user configures sensitivity thresholds and alert preferences via the touchscreen display on the user control panel 1100 or through the smartphone application connected via the wireless transceiver.

The system allows for detection threshold adjustments, enabling users to filter out non-threatening movements, such as those caused by small children, domesticated pets, or nearby wildlife. Once activated, the system continuously monitors for distinctive vibration signatures indicative of human or animal movement within the specified detection radius. The pattern recognition algorithm processes incoming sensor data in real time to classify movement as authorized (user, pet) or unauthorized (unknown human, large animal).

If the system detects an unauthorized entity approaching the tent, an audible alarm is triggered via the speaker in the user control panel 1100 or a connected smartphone device. The alarm volume, duration, and sound profile are customizable, allowing users to choose between gradual escalation, instant full-volume alerts, or a warning chirp before full activation. The system also activates the alert light, which flashes in a predefined pattern to serve as a visual deterrent and provide the user with immediate situational awareness.

If the audible alarm is not manually deactivated within a predetermined response window, the system automatically transmits an alert signal via the wireless transceiver using a cellular network, Wi-Fi, or satellite communication. In scenarios where no active wireless network is available, the system is capable of switching to a low-frequency radio transmission protocol, ensuring redundancy in emergency situations. The user may also manually override the alarm response, choosing to continue the audible alarm without transmitting an emergency signal, or silence the audible alarm while still sending the alert signal.

In response to a potential human intruder, the user can input a silent distress code on the user control panel 1100 or smartphone application, which suppresses the audible and visual alarms while transmitting a silent emergency signal to a 911 dispatch center, private security service, or designated emergency contact. The system may also incorporate encryption protocols to prevent unauthorized interception of distress signals, ensuring secure communication with emergency responders.

In one embodiment, the system includes fall detection functionality, utilizing vibration sensors, image sensors, or accelerometers to identify sudden impact events or irregular motion indicative of a fall. If a fall is detected, and the user does not respond within a predefined grace period, the system automatically triggers an emergency alert, notifying designated emergency contacts or emergency authorities.

For additional safety monitoring, the system may also detect prolonged absence from the tent by tracking user movement patterns. If the system registers that the user has exited the tent and has not returned within a user-specified timeframe, an automatic distress signal is transmitted, allowing emergency personnel or a designated contact to be alerted in case of an accident, medical emergency, or unexpected disappearance. These features, like all other system parameters, are fully customizable, ensuring personalized security configurations tailored to individual user needs.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A ground vibration personal security system, comprising:

a user control panel comprising a housing having a microcontroller operably connected to a display, a user input mechanism, at least one speaker, at least one alerting light, and a wireless transceiver that is configured to communicate remotely with an emergency authority via a wireless network;

at least one vibration sensor operably connected to the microcontroller, wherein the vibration sensor is configured to detect and analyze ground vibrations indicative of human or animal footsteps;

a logic processing unit stored in the memory of the microcontroller, wherein the logic processing unit is configured to:

analyze vibration signals to differentiate between human and animal movement patterns;

generate an alert when detected vibrations meet predefined parameters; and transmit an alert signal to an emergency authority when an alert condition is met;

wherein the user input mechanism is configured to receive a plurality of detection sensitivity levels and alarm settings via the user control panel.

2. The ground vibration personal security system of claim 1, further comprising a secondary sensor.

3. The ground vibration personal security system of claim 2, wherein the secondary sensor comprises an image sensor configured to assist the vibration sensor in detecting and distinguishing human and animal footsteps.

4. The ground vibration personal security system of claim 2, wherein the secondary sensor comprises at least one of:

an infrared sensor configured to detect body heat signatures;

an image sensor for identifying movement characteristics;

an audio sensor configured to detect sounds.

5. The ground vibration personal security system of claim 1, wherein the user control panel is composed of durable, lightweight materials that are adapted to be heat, cold, and weather resistant.

6. The ground vibration personal security system of claim 1, wherein the user control panel further comprises a rechargeable battery and an integrated solar panel, the solar panel being configured to recharge the battery.

7. The ground vibration personal security system of claim 1, wherein the system includes a silent alarm mode configure to transmit an alert signal to the emergency authority while suppressing an audible alarm and a visual alert indicators.

8. The ground vibration personal security system of claim 7, wherein the silent alarm mode is activated by a predefined code input on the user control panel or smartphone application, preventing unauthorized deactivation.

9. The ground vibration personal security system of claim 1, wherein the system is further configured to detect a fall via the vibration sensor and send an alert signal to the emergency authority if an audible alarm is not deactivated after a threshold amount of time passes after the detected fall.

10. The ground vibration personal security system of claim 1, wherein the system is configured to store gait patterns of individual users in order to detect when a user leaves or returns a predefined location defined by an area surrounding the user control unit.

11. The ground vibration personal security system of claim 10, wherein the system is configured to transmit an alert signal to the emergency authority if it is detected that the user leaves the predefined location and does not return after a threshold amount of time.

12. The ground vibration personal security system of claim 1, further comprising a light source disposed on the user control unit, wherein the light source is configured to generate a flashing light having a customizable duration and pattern via the user control unit.

13. The ground vibration personal security system of claim 1, wherein the wireless transceiver is configured to operate over multiple communication protocols, including cellular networks, radio frequency signals, and Bluetooth, to ensure alert transmission in different connectivity conditions.

14. The ground vibration personal security system of claim 1, wherein the display screen of the user control panel is a touchscreen interface that allows the user to input security preferences, adjust detection parameters, and view real-time alerts.

15. The ground vibration personal security system of claim 1, wherein the alert signal transmitted to the emergency authority includes GPS location data.

16. The ground vibration personal security system of claim 2, wherein the vibration sensor is disposed within the user control unit.

17. The ground vibration personal security system of claim 16, further comprising a secondary vibration sensor external to the user control unit.

18. The ground vibration personal security system of claim 1, further comprising a mobile electronic device having an interface and a display screen configured to receive alerts from the user control unit.

* * * * *